(12) United States Patent
Bouvy et al.

(10) Patent No.: US 6,613,817 B2
(45) Date of Patent: Sep. 2, 2003

(54) EMULSIONS

(75) Inventors: Alain Bouvy, Wezembeek Oppem (BE); Hanamanthsa Shankarsa Bevinakatti, Yarm (GB)

(73) Assignee: Imperial Chemical Industries PLC, London (GB)

( * ) Notice: Subject to any disclaimer, the term of this patent is extended or adjusted under 35 U.S.C. 154(b) by 28 days.

(21) Appl. No.: 10/006,617

(22) Filed: Dec. 10, 2001

(65) Prior Publication Data

US 2002/0115751 A1 Aug. 22, 2002

Related U.S. Application Data

(63) Continuation of application No. PCT/GB00/02201, filed on Jun. 6, 2000.

(30) Foreign Application Priority Data

Jun. 8, 1999 (GB) .............................................. 9913170

(51) Int. Cl.[7] ............................ C08L 67/06; C08K 5/17
(52) U.S. Cl. ....................... 523/503; 523/504; 524/221; 524/249; 524/250; 524/845
(58) Field of Search ................................. 523/503, 504; 524/221, 249, 250, 845

(56) References Cited

U.S. PATENT DOCUMENTS

| | | | |
|---|---|---|---|
| 4,271,051 A | | 6/1981 | Eschwey |
| 5,830,483 A | * | 11/1998 | Seidel et al. |

FOREIGN PATENT DOCUMENTS

| | | |
|---|---|---|
| EP | 0002252 A1 | 11/1978 |
| EP | 0741175 A2 | 4/1996 |
| WO | WO92/09667 | 6/1992 |
| WO | WO 93/21293 | * 10/1993 |

* cited by examiner

*Primary Examiner*—Tae H. Yoon
(74) *Attorney, Agent, or Firm*—Pillsbury Winthrop LLP

(57) ABSTRACT

An aqueous emulsion of a resin which includes as an emulsifier at least one compound of the formula (I): R1—CO—NR2R3 wherein R1 is a polyunsaturated hydrocarbyl group; R2 is a polyhydroxy hydrocarbyl radical; and R3 is hydrogen, a hydrocarbyl, particularly alkyl, group, a hydroxy or hydrocarbyloxy substituted hydrocarbyl, particularly hydroxy or alkoxy substituted alkyl, or is a group defined for R2. The resin is preferably an alkyd resin, and the emulsions are particularly useful for incorporating into paints.

16 Claims, No Drawings

EMULSIONS

CROSS REFERENCE TO RELATED APPLICATIONS

This application is a continuation of International Application No. PCT/GB00/02201, filed Jun. 6, 2000 which designated the U.S., and which further claims priority from British Application No. 9913170.8, filed Jun. 8, 1999, both of which are incorporated herein by reference.

This invention relates to emulsions and in particular to aqueous emulsions and/or dispersions of resins and/or polymers, especially alkyd resins, in which the emulsifier includes unsaturated fatty acid amides and to the production of such emulsions and/or dispersions.

Curable alkyd resins, often referred to as "air drying" alkyds, are used widely in industry in surface coatings such as paints, in particular decorative paints. They are well known materials and generally, they are film forming polyesters including residues of polybasic, usually di-basic, acid(s) and polyhydroxy, usually tri- or higher hydroxy alcohols and further including monobasic unsaturated (often multiple unsaturated) fatty acid residues. Such alkyd resins may include other residues and/or additives to provide specific functionality for the intended end use e g. sources of additional carboxyl groups may be included to improve resin emulsifyability. Curable alkyds are widely included in paints which may be solvent based, water based or use mixed solvent/water vehicles, in which the alkyd is in the dispersed phase. The alkyds are usually formed into an emulsion before incorporation into the paint and in such emulsions the alkyd is typically dispersed in the water phase as uniformly and generally as finely as is possible and commonly surfactants, particularly emulsifiers, are used to aid this.

Emulsifiers can contribute to fine and uniform alkyd resin droplets in emulsions. Typical emulsifiers are relatively low molecular weight surfactant materials which in emulsions are concentrated at least relatively at or near the resin/water interface. However, during drying of resin films made from emulsions, the emulsifiers tend to migrate to and accumulate either near the air/film or near the substrate/film interfaces and can have adverse effects on film water sensitivity, gloss retention, reduced adhesion on substrate, film haze, and on film hardness. Some of these effects can be mitigated by using reactive emulsifiers. For example, WO92/09667A describes the use of fatty acid alkoxylates of the general formula: R—CO—NH—($C_mH_{2m}$)—O—(AO)$_n$—H, where R is $C_7$ to $C_{23}$ polyunsaturated alkyl, m is 2–4, AO is an alkylene oxide residue, and n is 2–30, which are described as participating in the curing of the binder, thus reducing some of the adverse effects of surfactants. However, alkoxylate emulsifiers have a disadvantage in that although they can be very effective emulsifiers for alkyds, they are known to have adverse effects on the film forming/drying process.

The present invention is based on our finding that certain types of polyhydroxyhydrocarbyl substituted amides of polyunsaturated fatty acids are effective emulsifiers for alkyd resins, particularly unsaturated curable alkyd resins, and can give well cured films without deactivating typical alkyd drying catalysts, to give films of high hardness and having good water resistance.

The invention accordingly provides an aqueous emulsion of a resin which includes as an emulsifier at least one compound of the formula (I):

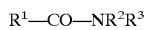

$R^1$ is a polyunsaturated hydrocarbyl group;

$R^2$ is a polyhydroxy hydrocarbyl radical; and $R^3$ is hydrogen, a hydrocarbyl, particularly alkyl, group, a hydroxy or hydrocarbyloxy substituted hydrocarbyl, particularly hydroxy or alkoxy substituted alkyl, or is a group as defined for $R^2$.

The invention also includes a paint which includes:

(1) an aqueous or mixed aqueous organic continuous phase;

(2) an alkyd resin emulsion discontinuous phase;

(3) at least one compound of the formula (I) (as defined above) as an emulsifier; and (4) at least one pigment.

The group $R^1$ is a polyunsaturated hydrocarbyl group i.e. it includes at least 2, particularly 2 or 3, ethylenic double bonds, and desirably is a $C_7$ to $C_{23}$, particularly $C_9$ to $C_{21}$, hydrocarbyl especially an open chain e.g. alka di-, tri or higher-enyl, group. Desirably the group $R^1$ contains 2 double bonds and is especially an alkadienyl group. In naturally occurring unsaturated fatty acids the double bonds are usually (internal) cis-double bonds e.g. in linoleic acid the double bonds are both cis within a group —CH=CH—CH$_2$—CH=CH— in the chain. The double bonds can be conjugated, but as the most readily available doubly unsaturated fatty acid is linoleic acid they will usually not be conjugated (although the double bonds is such materials can migrate to become conjugategd and or somerise from cis to trans, especially in the presence of a catalyst such as strong base).

The group $R^2$ is a polyhydroxy hydrocarbyl, particularly polyhydroxy alkyl, group, and desirably has a linear $C_4$ to $C_7$ chain and at least three hydroxyl groups directly bonded to chain carbon atoms. The group may include substituents, in particular, alkoxy groups e.g. by etherification of further hydroxyl groups or further polyhydroxy hydrocarbyl, e.g. polyhydroxy alkyl, group(s), but the group desirably includes at least three free hydroxyl groups including such hydroxyl groups on substituents of the basic chain. Particularly $R^2$ is an open chain tetratol, pentitol, hexitol or heptitol group or an anhydro e.g. cycloether anhydro, derivative of such a group. Especially desirably, $R^2$ is the residue of, or a residue derived from, a sugar, particularly a monosaccharide such as glucose, fructose or sorbitol, a disaccharide such as maltose or palitose or a higher oligosaccharide. It is particularly convenient that $R^2$ is the residue of a reducing sugar, because the amines can be made by straightforward reductive alkylation reactions on an amine $H_2NR^2$.

In the compounds of this invention the group $R^2$ is present as or as part of the hydrophile. Thus it will usually be desirable that the hydrophilicity of this group is not unduly reduced. The open chain form of such groups is typically the most hydrophilic form and will thus usually be the form desired. Groups including internal cyclic ether functionality can however be used, if desired, and may be obtained inadvertently if the synthetic route exposes the group to relatively high temperatures or other conditions which promote such cyclization.

Where $R^2$ is the residue of, or a residue derived from, a monosaccharide, the saccharide derived group or residue will usually be present as an open chain material. Where $R^2$ is the residue of, or a residue derived from, an oligosaccharide it can be considered as an open chain monosaccharide derived group or residue with a saccharide or oligosaccharide substituent which may be cylclic ar a chain of cyclic residues. Particularly useful $R^2$ groups are derived from glycoses and are of the formula: —CH$_2$—(CHOH)$_4$—

CH$_2$OH, e.g. corresponding to residues from glucose, mannose or galactose. In this case the group —NR$^2$R$^3$ is of the formula: —NR$^3$—CH$_2$—(CHOH)$_4$—CH$_2$OH and the group is conveniently called a glycamine group and the corresponding amides can be called glycamides. Most commonly the group R$^2$ will be derived from glucose and the corresponding amine and amides may be called glucamines and glucamides or as sorbityl amines or amides (though strictly they are 1-deoxyglucitylamines and 1-deoxyglucitylamides) respectively.

When R$^3$ is hydrocarbyl, it is desirably a C$_1$ to C$_{10}$ hydrocarbyl, particularly an alkyl group. When R$^3$ is hydroxy or hydrocarbyloxy substituted hydrocarbyl it is desirably a C$_1$ to C$_6$ hydrocarbyl, particularly an alkyl group substituted with hydroxy as in 2-hydroxyethyl, or a C$_1$ to C$_6$ alkoxy group as in 2methoxyethyl or 2-ethoxyethyl. When R$^3$ is a group R$^2$ it will usually be the same as the other group R$^2$, thus making the overall amino function a bis(polyhydroxy hydrocarbyl)amino group, for example a bis-(1-deoxyglucityl)amino group which may also be called a bis-(sorbityl)amino group.

The compounds of the formula (I) are typically made by reacting a polyunsaturated fatty acid of the formula (II): R$^1$COOH (II) where R$^1$ is as defined above, or a reactive derivative of such an acid e.g. a C$_1$ to C$_4$ ester such as a methyl or ethyl ester, or as a gylcerol ester such as in a glyceride oil, with an amine of the formula (III): H—NR$^2$R$^3$ where R$^2$ and R$^3$ are as defined above, typically in the presence of a catalyst e.g. a base such as an alkali metal carbonate.

The starting materials will usually be made from naturally occurring materials, in particular the polyunsaturated carboxylic acid R$^1$COOH will usually be derived from a fat oil or wax, and/or they will be made by processes including distillation. Such starting materials are typically mixtures and as such the products may include other materials. In particular, the fatty acid residues may include mono-unsaturated and or unsaturated residues. The compounds of the formula(I) can be used in combination with other non-ionic surfactants e.g. condensation products of alkylene oxide with linear or branched alcohol, alkylphenols, glycols, glycerol, vegetable oils, sorbitan esters, fatty acids, polyhydric alcohols such as sorbitol or random or block co-polymers of ethylene oxide and propylene oxide. In such mixtures the non-ionic emulsifiers used in this invention typically include at least 25%, more usually at least 50%, typically at least 60% and desirably at least 75%, e.g. at least 80%, of compounds of the formula(I).

The alkyd resins used in the invention are typically resins which are the reaction products of: one or more polybasic (di- or higher basic) organic acid or anhydride: e.g. phthalic anhydride; one or more polyhydric (usually a tri- or higher) alcohol: e.g. glycerol; and one or more monobasic fatty acid or one or more triglyceride : e.g. soya oil, tall oil fatty acids. The molar proportions of these component monomers are chosen to give the desired physical properties and molecular weight distribution of the resulting polyester. The monobasic fatty acid or triglyceride, will generally include unsaturation typically by using vegetable oils as the source of the fatty acid residues, and the presence of unsaturation leads to the air-curing properties of these materials. For this purpose the fatty acids are usually multiply unsaturated. The monobasic acid content of alkyd resins is often expressed as the oil length and, typically alkyd resins used in this invention will have an oil length of from 25 to 100%, typically from 30 to 80%. In order to provide the desired air drying properties, the proprotion of unsaturation, desirably multiple unsaturated, monobasic fatty acid residues will be at least 25%, and more usually at least 50%, often above 75% by weight of the monobasic fatty acid used in the alkyd resin. Most alkyds are film-forming polymers with a relatively low glass transition temperature, typically below 0° C., that are readily pigmented and usually accept additives to form coatings with a wide range of appearance, performance, and application characteristics. The alkyd resins used in this invention are typical of air-curing types of alkyd resin used in surface coating end use applications. Air drying modified alkyds such as siliconized alkyds, urethane alkyds, vinyl toluenated alkyds and thixotropic alkyds e.g. modified polyamide resins, can also be used in this invention. Suitable alkyds are widely available and are used extensively in surface coating applications.

We have found that it is desirable to use combinations of non-ionic surfactants of the formula (I) with anionic surfactants such as alkyl ether carboxylates, alkyl aryl sulphonates, phosphate esters, alkyl ether sulfates, hemi or di ester of sulphosuccinates, sulfated or sulphonated oils such as castor oil, or sulfonated tallow, alkyl or alkylene sulfates, or a mixture of at least two such anionic surfactants. These well known classes of anionic surfactant are as supplied either acidic or include counter ions to make them more nearly neutral. In this invention, neutralised anionic surfactants can be used or neutralising agents can be included in the compositions. Suitable counter ions include those derived from alkali metals, particularly sodium and potassium (suitably provided as hydroxide or carbonate) and, especially for ether carboxylates, amines, especially tertiary amines including hydroxyalkyl amines especially alkanolamines such as triethanolamine (TELA). Neutralisation at the point of use or in situ during emulsification can be carried out using suitable base such as alkali metal hyroxide or carbonate or amines, particularly alkanolamines such as TELA. Generally the amount of neutralising agent used is typically from 0.5 to 5% by weight of the emulsion, although, in practice, the amount of neutralising agent used will normally be that sufficient to achieve a desired pH level in the product emulsion. Generally, the pH of the final emulsion is from 3 to 10, particularly 5 to 9. Where an anionic surfactant is used, the neutralising agent (either in the surfactant or deliberately added) will typically be included in an amount to give a pH in these ranges.

When used, the anionic surfactant is typically used in proportions of non-ionic surfactant including compound of the formula (I) to anionic surfactant, particularly an alkyl aryl sulphonate, an ether carboxylate or a mixture of these surfactants, in the range 90:10 to 10:90, particularly 80:20 to 20:80 by weight, and especially about 75:25 by weight.

The invention accordingly includes an aqueous emulsion of an alkyd resin which includes as an emulsifier a compound of the formula (I) as defined above in combination with an anionic surfactant, particularly an alkyl ether carboxylate, an alkyl aryl sulphonate, a phosphate ester, an alkyl ether sulfate, or a mixture of at least two such anionic surfactants, where the weight ratio of compound(s) of the formula (I) to anionic surfactant is in the range 90:10 to 10:90.

The total amount of emulsifier, including non-ionic surfactant and anionic surfactant, used in emulsions of this invention will typically be from 2 to 20%, more usually from 5 to 15%, and desirably from 6 to 10%, by weight based on resin emulsified. In general lower amounts of emulsifier give emulsions with larger average particle size and usually higher polydispersity, generally implying a longer "tail" of relatively coarse emulsion droplets. Based on emulsions containing 50% of resin these correspond to general amounts of surfactant of from 1 to 10%, more usually from 2.5 to 7.5% and desirably from 3 to 5% by weight on the total emulsion. The amounts used for emulsions containing other resin proportions will vary accordingly.

The emulsions will typically contain from 30 to 60%, more usually from 40 to 55%, and particularly about 50% by weight of the emulsified resin.

Typical emulsion compositions by weight are exemplified in the following table:

| Material | amount (parts by weight) | |
|---|---|---|
| | typical | preferred |
| alkyd resin | 40 to 60 | about 50 |
| total surfactant | 0.5 to 7 | 0.6 to 6 |
| non-ionic | 0.5 to 5.5 | 2 to 5 |
| anionic (when used) | 0.5 to 5.5 | 2 to 5 |
| weight ratio non-ionic:anionic (when anionic used) | 90:10 to 10:90 | 80:20 to 20:80 |
| neutralising agent (1) | pH 3 to 10 | pH 3 to 10 |
| water | to 100 | |

(1) the amount of neutralising agent (if any) is sufficient to give a pH in the stated range. The amount of surfactant expressed as a percentage based on the weight of the resin is typically from about 5 to about 15%, more usually from 6 to 10%.

Other materials e.g. process additives can be added either to the aqueous phase or to the oil phase prior to emulsification in order to facilitate the emulsification process. Process additives include:

adjunct solvents e.g. glycols or glycol ethers such as methoxypropanol, typically in amounts of 1 to 10%, particularly 3 to 7% by weight of the emulsion, may be included as processing aids.

antifoam agents or defoamers which when used will typically be used in amounts of from 0.01 to 2% by weight of the emulsion;

neutralising or buffering agents to adjust the pH of the emulsion during or after formation to a suitable level, usually not strongly acidic or alkali, which when used will typically be used in amounts of corresponding to 0 to 150%, more usually from 40 to 110% expressed as a percentage of the resin acid value;

rheology modifiers which when used will typically be used in amounts of from 0.5% to 20%, more usually 0.5 to 10%, particularly 0.5 to 3%, by weight of the emulsion.

electrolytes which when used to control the inversion mechanism will typically be used in amounts from 1 mmol.l$^{-1}$ to 100 mmol.l$^{-1}$ of emulsion.

The emulsions of the invention can be prepared either by the direct or, and desirably, by the inversion methods. Inverse emulsification can, in particular be done by forming a mixture of the resin and surfactant, including surfactant of the formula(I), adding water to form a water-in-oil(resin) emulsion, continuing water addition until the emulsion inverts to form an oil(resin)-in-water emulsion and, if necessary e.g. to prevent re-inversion of the emulsion and/or to adjust the solids content of the emulsion, adding further water to adjust the disperse phase content of the emulsion to that desired. This technique is known in the art as the Emulsion Inversion Point (EIP) method.

The invention accordingly includes a method of making an aqueous emulsion of an alkyd resin which comprises forming a mixture of the resin and surfactant, including at least one surfactant of the formula(I), including water in the mixture to form a water-in-oil(resin) emulsion, and subsequently adding water to the water-in-oil emulsion at least until the emulsion inverts to form an oil(resin)-in-water emulsion and, optionally, adding further water to adjust the disperse phase content of the emulsion to that desired.

The temperature at which the emulsification is carried out very much depends upon the properties of the resin, more particularly the viscosity. For resins which are solid or viscous liquids at ambient temperature, elevated temperatures may be needed in the emulsification. Even for resins which are liquid at ambient temperature it may be advantageous to use higher processing temperatures e.g. to obtain finer emulsions, and for alkyd resins temperature in the range 30 to 100° C., particularly 40 to 90° C. and especially about 80° C. can usefully be used.

The alkyd emulsions of the invention can be used for the preparation of waterborne paints or coatings by mixing with at least one separately prepared pigment dispersion. This procedure often referred to as "letdown" is carried out under gentle agitation as is well known in the art. The success of the letdown step depends on achieving an intimate intermingling of these two disparate particle systems to yield a stable and uniform overall particle suspension (the alkyd-based paint). The practical performance of such paint formulations will usually be improved by including other additives such as driers, rheology modifiers, wetting and compatibility agents, flow and levelling agents etc. which will typically be incorporated at this stage. Typical applications of formulations include wood coatings, high gloss architectural paints etc.

For use in surface coating applications, the formulations will usually include one or more catalysts or driers. Driers are typically oil/resin soluble metal salts such as naphthenates. Driers are typically incorporated at levels of 1 to 10% by weight based on the resin. Co-driers can also be included such as the commercial material Nuac NOPN. Such materials are also described as loss of dryness inhibitors as they can counter possible inhibition of driers by the presence of e.g. anioninc surfactants or emulsifiers. Their inclusion can give faster or more complete hardeneing of the resin film in a coating thus enhancing performance. Co-driers are typically incorporated at levels of 1 to 10% by weight based on the resin.

The following Examples illustrate the invention. All parts and percentages are by weight unless otherwise stated.

| Materials | |
|---|---|
| Non-ionic Surfactants | |
| NIE1 | glucamide surfactant made in SE1 |
| NIE2 | glucamide surfactant made in SE2 |
| NIC1 | C12–C15 Alcohol ethoxylate (10 moles EO) surfactant for comparison |
| Anionic surfactants | |
| SA 1 | Alkyl ethercarboxylate, Neodox 45/6 ex Shell |
| SA 2 | Sulphonated oil, Calsolene oil HS ex Uniqema |
| SA 3 | Nonyl phenol ether phosphate, Atphos 3205 E ex Uniqema |
| SA 4 | 1:1 combination of SA 1 and SA 3 |
| Resins | |
| Alkyd Resins | |
| AR1 | Medium oil alkyd resin 49% oil length in white spirit (55% resin solids) |

-continued

| | Materials |
|---|---|
| | Other materials |
| MeP | 1-methoxy-2-propanol used as a viscosity modifier |
| NaOH | 10% aqueous NaOH solution |
| water | demineralised water |
| MPG | (mono)propylene glycol |
| Methyl linoleate | acid (from linseed or soya oils) |
| DR1 | Nuodex Combi ASR oil soluble Co, Sr and Ca drier ex Servo |
| DR2 | Servosyn Combi LS drier ex Servo |
| DR3 | Nact NOPB co-drier |
| ASE | Exkin 2 anti-skinning agent ex Servo |

Methods

Resin emulsion were made by inversion emulsification method. In the laboratory methods of the Examples, emulsions were made in 250 ml or 500 ml vessels using an IKARW20.n mixer with stirring using a paddle bladed stirrer at a rotational speed of 2000 rpm (ca 33 Hz) with a 4 cm diameter 6-bladed paddle (unless otherwise stated). After inversion, the emulsion viscosity decreases and the stirring can be less vigorous e.g. about 300 rpm (5 Hz). The temperature used was 80° C. The liquid (liquefied) resin was placed in the emulsification vessel, the surfactants were melted (if necessary) and added to the resin, the mixture stirred thoroughly and emulsified as described above. After inversion the remaining water could be added quickly.

Film Hardness

The film hardness of freshly made alkyd resin films and aged films was measured with a Koenig pendulum. In this test, a mixture of the alkyd resin, driers, antiskinning agent and 1-methoxy-2-propanol is prepared and the emulsifiers to be tested are added at various concentrations e.g 6, 10 or 12% on the resin. The results are quoted as a percentage of the measured hardness of films made from reference i.e. resin coating made including no emulsifying surfactant.

Particle Size Analysis

Emulsion particle size was measured using a Malvern Zetasizer 4 (covering the size range 50 nm to 1 μm) and the particle size reported as cumulative Z-average (ave) in nm, instrumentally calculated polydispersity (Poly), mean particle size (mean) in nm and peak width of the largest peak (width) in nm. Measurements were made on emulsion freshly made and after storage for 1 month at various temperatures.

pH

Was measured using a WTW pH 537 meter.

Aging

Some emulsion samples were stored (aged) and re-tested. Aging is indicated by a code in which the first character indicates the length of storage ("0"=noaging), the second character the storage time in weeks (W) or months (M). Storage is at ambient temperature unless otherwise indicated.

Gloss

Gloss was measured with a 20° angle of reflectance using a Dr Lange reflectometer and is expressed in %. Gloss retention was measued as the gloss after 1 month film exposure to daylight. Gloss was also measured on paint films made using paint that had been subject to storage for 1 month.

Yellowing

The colour of the paint film was measured measured with a spectrophotomer, according to the CIE—L*a*b* colour space method. Yellowing is expressed as the difference in delta b values after film exposure at 1 month daylight or 1 month in the dark.

Krebs Viscosity

Was measured at 25° C.

SYNTHESIS EXAMPLE 1

A heterogeneous mixture of linseed/soybean fatty acid methyl ester (580.8 g, 1.98 mol), N-methylglucamine (425.6 g; 2.18 mol), MPG (104 g) and $K_2CO_3$ (5.49 g; 2 mol %) was initially melted at 145–150° C. and then the temperature was brought down to 125° C. The reaction mixture was held at this reaction temperature under stirring for 2 to 5 hours when the reaction was complete as monitored by TLC and IR. The product was cooled to ambeint temperarture and used without further work up or purification.

SYNTHESIS EXAMPLE 2

Example SE1 was repeated except that soya oil was used in a corresponding molar amount instead of the fatty acid methyl esters used in SE1. The product was used without further purification.

Application Example 1

The influence of emulsifiers upon hardness development of a clear resin film was investigated by adding emulsifiers to the mixture described in the Table below.

| Material | Amount (parts by wt) | |
|---|---|---|
| AR1 | 87.87 | |
| MeP | 8.79 | |
| DR1 | 2.9 | |
| ASE1 | 0.44 | 100 total |

The dried films were tested for hardness, on fresh films (nominal 1 day ageing) and films ages for 1, 2 and 4 weeks, and the results are included in Table 1. The test models the effect of surfactants on the hardness of films made from emulsions of the alkyd resins.

TABLE 1

| Ex No | Emulsifier | | | a-mount* | Hardness | | | |
|---|---|---|---|---|---|---|---|---|
| | non-ionic | anionic | ratio | | 1D | 1W | 2W | 4W |
| 1.1C | — | — | — | 0 | 100 | 100 | 100 | 100 |
| 1.2C | NIC1 | — | — | 6 | 71 | 64 | 63 | 74 |
| 1.1 | NIE1 | — | — | 6 | 117 | 106 | 89 | 94 |
| 1.2 | NIE2 | — | — | 6 | 100 | 88 | 86 | 84 |
| 1.3C | NIC1 | — | — | 12 | 50 | 48 | 37 | 38 |
| 1.3 | NIE1 | — | — | 12 | 108 | 91 | 76 | 77 |
| 1.4 | NIE2 | — | — | 12 | 83 | 71 | 72 | 74 |
| 1.3C | NIC1 | SA 1 | 3:1 | 10 | 67 | 61 | 47 | 49 |
| 1.5 | NIE1 | SA 1 | 3:1 | 10 | 117 | 100 | 84 | 87 |
| 1.4C | NIC1 | SA 2 | 2:1 | 10 | 75 | 58 | 60 | 62 |
| 1.5 | NIE1 | SA 2 | 2:1 | 10 | 108 | 77 | 74 | 80 |

*percentage by weight emulsifier based on resin formulation (excluding emulsifier)

Application Example 2

Alkyd resin emulsions were made by the emulsion inversion point method using combinations of non-ionic emulsifier and anionic emulsifier. The emulsion composition is set out in Table 2a and pH and particle size testing data on fresh and stored emulsions are included in Table 2b below.

TABLE 2a

| | | | Emulsifier | | | | | |
| | | | non-ionic | | anionic | | | |
| Ex No | alkyd | type | amount | type | amount | ratio | NaOH | water |
|---|---|---|---|---|---|---|---|---|
| EV1763-16/2 | 3.1 | 50 | NIE1 | 3.75 | SA 3 | 1.25 | 75/25 | 3.5 | to 100 |
| EV1763-16/3 | 3.2 | 50 | NIE1 | 3.75 | SA 1 | 1.25 | 75/25 | 3.5 | to 100 |
| EV1763-16/4 | 3.3 | 50 | NIE1 | 3.3 | SA 4 | 1.2 | 73/27 | 3.3 | to 100 |
| | 3.4 | 50 | NIE2 | 3.25 | SA 3 | 1.75 | 65/35 | 3.5 | to 100 |

TABLE 2b

| | | Emulsifier | | | | Particle size (nm) | | | |
| Ex No | Ratio | (wt %) | Storage | pH | Ave | Poly | Mean | width |
|---|---|---|---|---|---|---|---|---|
| 3.1 | 75/25 | 10 | Initial | 8.1 | 220 | 0.35 | 260 | 333 |
| | | | Amb | 8.0 | 206 | 0.28 | 236 | 274 |
| | | | +5° C. | 8.1 | 204 | 0.3 | 236 | 281 |
| | | | +50° C. | 6.7 | 195 | 0.17 | 211 | 195 |
| 3.2 | 75/25 | 10 | Initial | 9.0 | 257 | 0.19 | 282 | 276 |
| | | | Amb | 8.8 | 238 | 0.49 | 302 | 443 |
| | | | +5° C. | 9.0 | 211 | 0.31 | 245 | 297 |
| | | | +50° C. | 6.8 | 218 | 0.29 | 250 | 295 |
| 3.3 | 73/27 | 9 | Initial | 8.6 | 235 | 0.35 | 278 | 355 |
| | | | Amb | 8.6 | 241 | 0.05 | 248 | 138 |
| | | | +5° C. | 8.7 | 240 | 0.27 | 274 | 315 |
| | | | +50° C. | 6.9 | 240 | 0.21 | 265 | 271 |
| 3.4 | 65/35 | 10 | Initial | 9.7 | 283 | — | 308 | 291 |

Application Example 3

Water based paint formulations were made up from the alkyd emulsions made in Application Example 2 by the conventional 2 stage process. The basic composition of the paint is set out in Table 3a and the amounts of emulsifier and driers are given in Table 3b below. Basic paint properties are set out in Table 3c. Further investigation into drying and the hardness of the paint films was carried out using the paint compositions in Table 3b in which in 3.4 to 3.9 a co-drier is included and the result is that even better hardness results are obtained which are summarisedin Table 3d.

TABLE 3a

Alkyd emulsion based paint composition (% w/w)

Mill base

| Disperbyk 190 | 1.33 | Dispersing agent ex BYK |
| Acrysol RM8 | 0.43 | Rheology modifier ex Rohm & Haas |
| Byk 024 | 0.1 | Foam control agent ex BYK |
| Kronos 2160 | 25.57 | Titanium dioxide pigment ex Kronos |
| water | up to 100 | Vehicle |

Let Down

| Mill base | 33.5 | As above |
| Alkyd emulsion (50% dry rest) | 56.5 | Film forming resin |
| Acrysol RM 2020 | 3.09 | Rheology modifier ex Rohm & Haas |
| Acrysol RM8 | 0.75 | Rheology modifier ex Rohm & Haas |
| DR2 | 0.71 | |
| BYK 348 | 0.32 | Levelling agent ex BYK |
| monopropylene glycol | 1.32 | co-solvent |
| NaOH | to pH 9 | pH adjustment |
| water | up to 100 | Vehicle |

TABLE 3b

| | Emulsifier | | | | Drier | | co-drier | |
| Ex No | nonionic | anionic | ratio | amount* | nature | amount | nature | amount* |
|---|---|---|---|---|---|---|---|---|
| 3.1.C | NIC 1 | SA 1 | 3:1 | 10 | DR2 | 0.71 | — | |
| 3.1 | NIE 1 | SA 3 | 3:1 | 10 | DR2 | 0.71 | — | |
| 3.2 | NIE 1 | SA 1 | 3:1 | 10 | DR2 | 0.71 | — | |
| 3.3 | NIE 1 | SA 4 | 3:1.1 | 9 | DR2 | 0.71 | — | |
| 3.4 | NIE 1 | SA 3 | 3:1 | 10 | DR2 | 0.71 | DR3 | 1.2 |
| 3.5 | NIE 1 | SA 1 | 3:1 | 10 | DR2 | 0.71 | DR3 | 1.2 |
| 3.6 | NIE 1 | SA 4 | 3:1.1 | 9 | DR2 | 0.71 | DR3 | 1.2 |
| 3.7 | NIE 1 | SA 3 | 3:1 | 10 | DR2 | 0.71 | DR3 | 2.4 |
| 3.8 | NIE 1 | SA 1 | 3:1 | 10 | DR2 | 0.71 | DR3 | 2.4 |
| 3.9 | NIE 1 | SA 4 | 3:1.1 | 9 | DR2 | 0.71 | DR3 | 2.4 |

*% on resin

TABLE 3c

| Ex No | A-ging | pH | Krebs viscosity | Gloss Initial | Gloss Retention | Gloss Stored | Yellowing daylight | Yellowing dark |
|---|---|---|---|---|---|---|---|---|
| 3.1 | 0 | 9.3 | 117 | 91 | 81 | 91 | 0.94 | 1.96 |
|  | 1M | 8.5 | 119.6 | NA | NA | 93.3 | NA | NA |
|  | 3M | 8.5 | 120.2 | NA | NA | 95 | NA | NA |
| 3.2 | 0 | 9.3 | 117 | 96.3 | 86.1 | 96.3 | 0.69 | 1.43 |
|  | 1M | 8.3 | 117 | NA | NA | 93.3 | NA | NA |
|  | 3M | 8.4 | 116 | NA | NA | 92 | NA | NA |
| 3.3 | 0 | 9.2 | 115 | 93 | 85 | 93 | 0.7 | 1.44 |
|  | 1M | 84 | 116 | NA | NA | 94.5 | NA | NA |
|  | 3M | 8.5 | 116 | NA | NA | 95 | NA | NA |

TABLE 3d

Hardness development

| Ex No | Hardness 1D | 1W | 2W | 4W |
|---|---|---|---|---|
| 3.1.C | 70 | 71 | 63 | 65 |
| 3.1 | 100 | 93 | 79 | 80 |
| 3.2 | 100 | 100 | 89 | 90 |
| 3.3 | 100 | 100 | 95 | 95 |
| 3.4 | 100 | 93 | 84 | 85 |
| 3.5 | 100 | 100 | 95 | 95 |
| 3.6 | 100 | 100 | 100 | 100 |
| 3.7 | 100 | 100 | 89 | 90 |
| 3.8 | 100 | 107 | 100 | 100 |
| 3.9 | 100 | 107 | 105 | 105 |

What is claimed is:

1. An aqueous emulsion of a resin which includes as an emulsifier at least one compound of the formula (I):

$R^1$ is a polyunsaturated hydrocarbyl group;
$R^2$ is a polyhydroxy hydrocarbyl radical; and
$R^3$ is hydrogen, a hydrocarbyl group, a hydroxy or hydrocarbyloxy substituted hydrocarbyl, or is a group as defined for $R^2$.

2. An emulsion according to claim 1 wherein $R^1$ is a $C_7$ to $C_{23}$ polyunsaturated hydrocarbyl group.

3. An emulsion according to claim 1, wherein $R^1$ is an alkadienyl group.

4. An emulsion according to claim 1, wherein $R^2$ has a linear $C_4$ to $C_7$ chain and at least three hydroxyl groups directly bonded to the chain carbon atoms.

5. An emulsion according to claim 1, wherein $R^3$ is the residue of, or a residue derived from, a sugar.

6. An emulsion according to claim 5 wherein the sugar is a monosaccharide or a disaccharide.

7. An emulsion according to claim 1, wherein $R^3$ is a $C_1$ to $C_{10}$ hydrocarbyl.

8. An emulsion according to claim 1, wherein $R^3$ is a $C_1$ to $C_6$ hydrocarbyl, substituted with hydroxy, or a $C_1$ to $C_6$ alkoxy group.

9. An emulsion according to claim 1 additionally including at least one anionic surfactant.

10. An emulsion according to claim 9 wherein where the weight ratio of compound(s) of the formula (I) to anionic surfactant is in the range 90:10 to 10:90.

11. An emulsion according to claim 1, wherein the resin is an alkyd resin.

12. A method of making an aqueous emulsion of an alkyd resin which comprises forming a mixture of the resin and surfactant, including at least one surfactant of the formula (I)

$R^1$ is a polyunsaturated hydrocarbyl group;
$R^2$ is a polyhydroxy hydrocarbyl radical; and
$R^3$ is hydrogen, a hydrocarbyl group, a hydroxy or hydrocarbyloxy substituted hydrocarbyl, or is a group as defined for $R^2$; including water in the mixture to form a water-in-oil(resin) emulsion, and subsequently adding water to the water-in-oil emulsion at least until the emulsion inverts to form an oil(resin)-in-water emulsion and, optionally, adding further water to adjust the disperse phase content of the emulsion to that desired.

13. A paint which includes:
(1) an aqueous or mixed aqueous organic continuous phase;
(2) an alkyd resin emulsion discontinuous phase;
(3) at least one compound of the formula (I)

$R^1$ is a polyunsaturated hydrocarbyl group;
$R^2$ is a polyhydroxy hydrocarbyl radical; and
$R^3$ is hydrogen, a hydrocarbyl group, a hydroxy or hydrocarbyloxy substituted hydrocarbyl, or is a group as defined for $R^2$ an emulsifier; and (4) at least one pigment.

14. An emulsion according to claim 1, wherein $R^3$ is hydrogen, alkyl, hydroxy or hydrocarbyloxy substituted alkyl, or is a group as defined for $R^2$.

15. A method according to claim 12, wherein in the formula (I), $R^3$ is hydrogen, alkyl, hydroxy or hydrocarbyloxy substituted alkyl, or is a group as defined for $R^2$.

16. A paint according to claim 13, wherein in the formula (I), $R^3$ is hydrogen, alkyl, hydroxy or hydrocarbyloxy substituted alkyl, or is a group as defined for $R^2$.

* * * * *